Aug. 6, 1940.　　　　　O. ALBIETZ　　　　　2,210,352
ELECTRIC SOLDERING DEVICE
Filed July 27, 1937
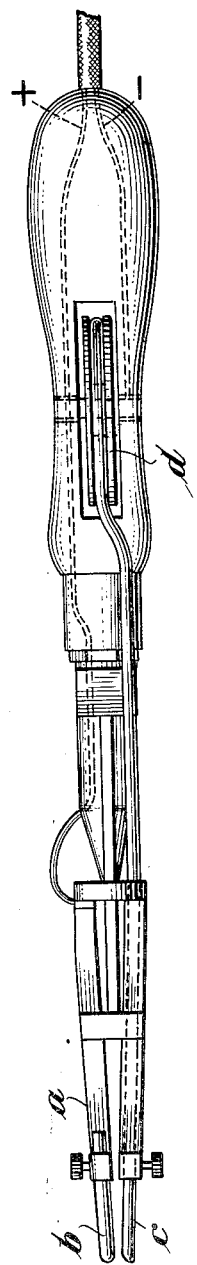
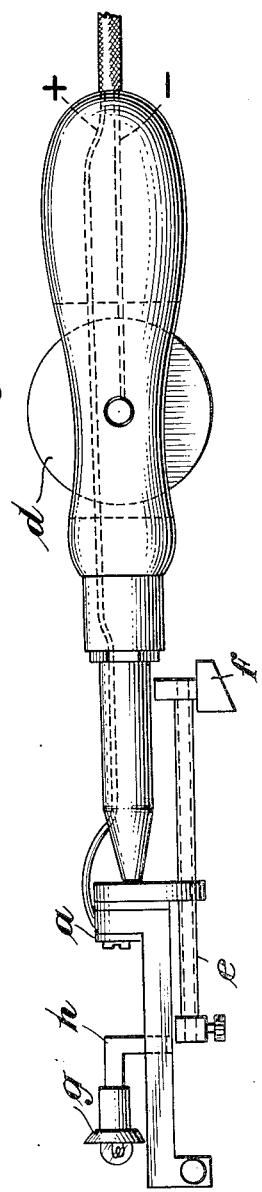
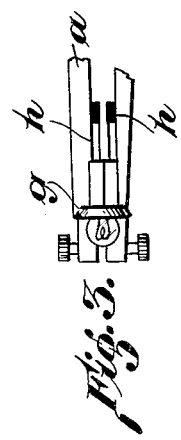
Inventor:
Otto Albietz,
by Ferd. Nusch
Attorney.

Patented Aug. 6, 1940

2,210,352

UNITED STATES PATENT OFFICE 2,210,352

ELECTRIC SOLDERING DEVICE

Otto Albietz, Lorrach, Baden, Germany, assignor to Robert König, Lorrach, Baden, Germany Application July 27, 1937, Serial No. 155,986
In Germany August 6, 1936

3 Claims. (Cl. 219—27)

This invention relates to an electric soldering device comprising two electrodes between which the circuit is closed through the workpiece to be soldered, and one of which electrodes consists of a lead of a material with a relatively high resistance for instance with tapered point carbon, the other consisting of the solder adapted to be fed.

Soldering devices are known in which the solder touches the carbon electrode and thus the circuit is closed without the workpiece forming part of the circuit. Soldering with this known device is not satisfactory as the workpiece takes the solder only if both parts, solder and workpiece, have the same temperature. If hot tin drops into the cold workpiece, it does not bind. In this construction the workpiece must be heated by the carbon electrode. As, however, the current flows directly from the carbon electrode to the solder, the carbon electrode cannot give up sufficient heat to the workpiece to bring it to the temperature necessary for satisfactory soldering. If, however, such great current intensities are employed that also the point of the carbon electrode gets hot, the solder electrode will flow off, and there is no guarantee that the solder point is heated to the necessary temperature.

Devices have therefore been constructed, in which the circuit is closed by the workpiece. The two separated poles are then brought into contact with the solder point, these poles being either held against the soldering point with both hands, or one pole is fixed on a support and the workpiece together with the other pole is held against it with the hands. In this device therefore both hands are always required for the soldering.

The invention operates on the latter principle, that is the circuit is closed by the workpiece and the apparatus comprises a handle on which a pointed electrode of a material with a relatively high resistance, such as carbon, is fixed and on which the soldering material forming the second electrode is shiftably mounted so that it is close to the carbon electrode but does not contact therewith.

An embodiment of the invention is illustrated, by way of example, in the accompanying drawing in which Fig. 1 shows the device in elevation.
Fig. 2 shows the same device turned 90° around its longitudinal axis.
Fig. 3 shows the lighting device turned through an angle of 90° relatively to Fig. 2.

A guide holder $a$ carries on one arm a stationary carbon electrode $b$ pointed at its front end and on the other arm which is insulated from the first a solder stick $c$ is shiftably mounted and forms the second electrode. A store of solder wire may be accommodated on a spool $d$ in the handle. In order that during the soldering the solder can be easily fed, a shifting device $e$ may be arranged on holder $a$ and in this device the solder wire $c$ is clamped and can be pushed forward by pressure exerted upon a knob $f$. As the axes of the two electrodes form an acute angle the distance between the two electrodes can also be altered at the same time by the shifting of the solder, but only in such a manner that the electrodes never directly touch the one with the other. Low tension current of 6 to 8 volts supplied to the electrodes in known manner by an insulated cable is sufficient for heating the soldering device.

For lighting the soldering point a two-pole bracket $h$ carrying an electric bulb $g$ may be clamped between the two electricity conducting arms of the guide holder $a$. The bracket $h$ serves on the one hand to securely hold the bulb on holder frame $a$ and on the other hand to supply the bulb with electric current.

If for the solder $c$ a metal pin of higher melting temperature is substituted, the device may be employed for soldering one piece onto the other.

The operation of the apparatus is as follows: The two electrodes are placed on the workpiece at the point to be soldered. As the current flows through, the tapered point of the carbon electrode is heated and transmits its heat to the solder point and thence onto the solder. When the solder point has attained the required temperature, the solder begins to flow and is fed according to requirements. The solder is therefore in the required position at the proper moment.

Compared with the known devices the invention presents the advantage that both electrodes, although the circuit between them is closed through the solder point which has to be heated, can be actuated together with the solder only with one hand, as they are mounted on a single handle. For soldering only one hand is therefore required. In the wireless industry, and also for other fine-mechanical work in which soldering has to be done frequently in the neighbourhood of hanging down combustible elements, it is very important to have one hand free to move these hanging elements aside to make room for the soldering device.

Moreover the distance between the two electrodes can be accurately preserved, which is not possible in the same measure when working with both hands with separated electrodes. This preserving of the distance is particularly important for soldering thin wires which burn instantaneously if the distance between the electrodes becomes only a little too small. On the other hand, cooling easily occurs on solid workpieces, with the result that the solder ceases to bind. It is essential that only a minimum amount of heat is developed at the poles which are close together and work always at the same distance apart. This is not possible when working with both hands as at such small distance the poles would inevitably contact.

I claim:

1. An electric soldering device, comprising in combination a handle, a solder carrying reel accommodated in said handle, two substantially parallel arms projecting from the front end of said handle and insulated the one from the other, a carbon electrode projecting from the extremity of one of said arms, a solder reel wound on said rod and extending along the other of said arms to form the second electrode, means for holding the solder at the extremity of the other of said arms, means arranged on said handle between said reel and said holding means for feeding and guiding the solder passing from said reel to said holding means, and two insulated wires one extending through said handle and along one arm to said carbon electrode and the other connected to said reel and consequently to the solder, the circuit being closed by bringing said carbon electrode and solder electrode into contact with the workpiece.

2. An electric soldering device as specified in claim 1 in which the axes of the two electrodes form an acute angle.

3. In an electric soldering device as specified in claim 1 a two-poled bracket clamped between the two arms of the holder, and an electric bulb in said bracket in close proximity to the ends of the electrodes and adapted to illuminate the portion of the workpiece between these electrodes.

OTTO ALBIETZ.